No. 656,137.  
T. B. JEFFERY.  
GRIP.  
(Application filed June 4, 1898.)  
Patented Aug. 14, 1900.

(No Model.)

Witnesses.  
Wm. N. Rheem.  
Harold E. Barrett.

Inventor  
Thomas B. Jeffery  
by Walter H. Chamberlin  
Atty.

UNITED STATES PATENT OFFICE.

THOMAS B. JEFFERY, OF CHICAGO, ILLINOIS.

GRIP.

SPECIFICATION forming part of Letters Patent No. 656,137, dated August 14, 1900.

Application filed June 4, 1898. Serial No. 682,571. (No model.)

*To all whom it may concern:*

Be it known that I, THOMAS B. JEFFERY, a citizen of the United States, residing at Chicago, county of Cook, State of Illinois, have invented a certain new and useful Improvement in Grips; and I declare the following to be a full, clear, and exact description of the invention, such as will enable others skilled in the art to which it pertains to make and use the same, reference being had to the accompanying drawings, which form a part of this specification.

My invention has for its object the construction of a grip or handle for a bicycle or other object, which can be detachably secured to a bar, preferably of tubular material, although not necessarily so, and a handle or grip which will contain advantages of improvement that will reduce the cost of manufacture and increase the usefulness of the article.

The invention relates particularly, although not necessarily, to the application of a grip or handle to a bar of uniform diameter—that is to say, one that is not reduced at the handle end.

The invention has several distinctive features, among them the following: the provision of two ferrules between which the grip is clamped, one ferrule being held from movement along the bar by stops thereon, while the other is adjustable endwise toward and from the first.

Another feature is the form of the two ferrules, each comprising a main fitting adapted to slip onto the bar and each provided with concave abutting surfaces for clamping the grip between them.

Another feature is the grip proper, made, preferably, of compressible material, such as cork. The said cork when compressed longitudinally will expand radially both externally and internally, so that the diameter of the bore will be reduced.

Another feature is the extensive bearing of each ferrule on the bar, whereby any rocking of the concave shoulder of each ferrule is prevented.

The invention consists of other minor features hereinafter more fully described and claimed.

Figure 1:
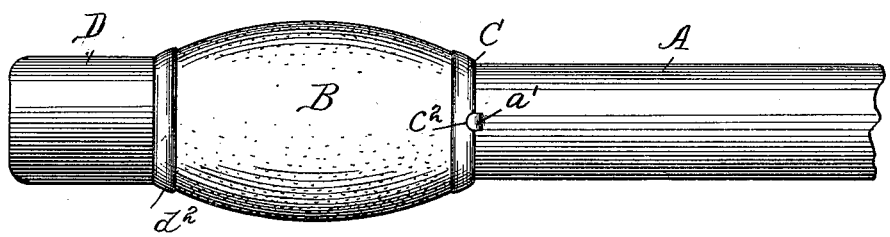
Figure 2:
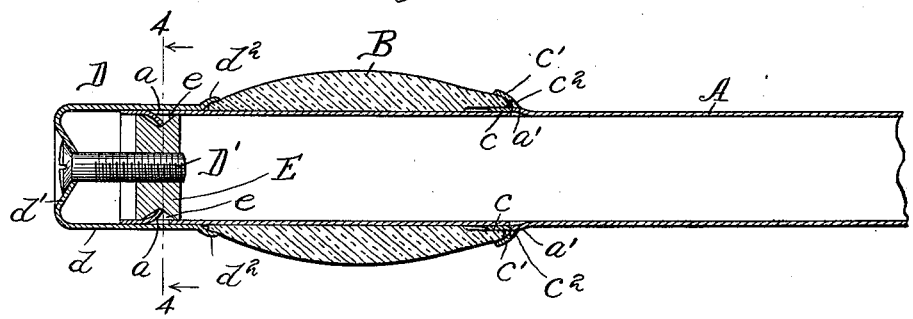
Figure 3:
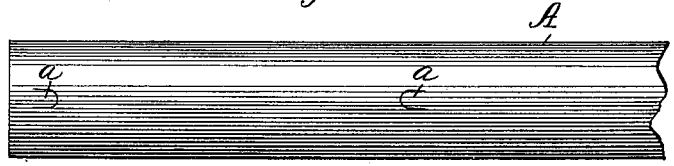
Figure 4:
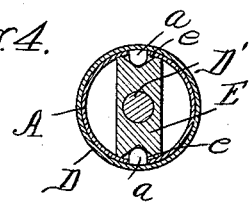

In the drawings, Figure 1 is a side elevation of a portion of the handle-bar, showing my improved handle or grip. Fig. 2 is a longitudinal section thereof. Fig. 3 is a side elevation of a portion of the bar. Fig. 4 is a cross-section on the line 4 4 of Fig. 2.

In carrying out the invention, A represents a tubular handle-bar. While I have shown my invention as applied to a tubular handle-bar, yet it is obvious that there are several features thereof which might be incorporated in a handle for a solid bar, such as a wooden bar.

B represents the grip, made, preferably, of cork or other compressible material, although not necessarily limited thereto.

C represents a ferrule comprising, as shown in Fig. 2, a main portion $c$ and a concave flange $c'$. D is another ferrule comprising a main portion $d$, a closed end $d'$, provided with a suitable perforation, through which a screw $D'$ may be passed, and a concave flange $d^2$.

E is a block (shown in Fig. 2) having a transverse orifice, which is secured thereto to receive the screw $D'$, the ends of said block being recessed, as at $e$, Fig. 4, the block being held in the end of the tube A by projections $a$, which are struck from the metal composing the tube. $a'$ are also projections struck from the metal composing the tube, adapted to enter recesses $c^2$ in the ferrule C, the projections $a$ serving both as stops to limit the movement of the ferrule along the tube and also to prevent a rotation of the ferrule on the tube.

It will be seen by the above description that in the manufacture of my handle and bar the projections $a'$ are formed from the metal, and the block E is placed in the end of the tube and the projections $a$ bent against it to lock it in place. The ferrule C is then slipped on and brought to a bearing against the stops $a'$. The grip B is then slipped on, the end thereof entering under the flange $c'$ and being held firmly in place thereby. The ferrule D is then slipped on, its flange $d^2$ brought against the other end of the grip, and the screw $D'$ is then inserted and acts to bring the ferrule D firmly against the grip. The desired amount of endwise pressure can be obtained through the screw $D'$, and because of the compressible material of which the grip is composed the clamping thereof endwise or longitudinally will act to reduce the interior diameter, and thus fasten the grip tightly onto the tube. Any variation in size of the grip on its interior can be taken up by tightening the screw D'.

By the above construction it will be seen that an extremely cheap, simple, and durable fastening between the bar and grip is obtained and without the use of cement or other permanent engaging means, while at the same time the construction permits a small diameter of the rear ferrule, thus making the handle more shapely for the hand.

What I claim is—

1. The combination with a handle-bar, of a grip sleeved thereon, stops bent up from the metal of the bar, a ferrule at the inner end of the grip resting against the stops, and means for securing the grip in place.

2. The combination with a handle-bar, of a grip thereon, ferrules for engaging the ends of the grip, stops bent up from the metal of the bar against which the inner ferrule rests, a block or nut in the end of the bar and a screw engaging the outer ferrule and block, substantially as described.

3. In a handle-bar, the combination with a metal bar having stops bent from the metal thereof, of a grip limited in its movement by the stops, and sleeved on the bar, substantially as described.

4. The combination with a tubular metal handle-bar having stops upset from the metal thereof, of a notched ferrule engaging the stops and a grip engaging the ferrule and said stop engaging the notch of the ferrule, substantially as described.

5. In a handle-bar, the combination with a tubular bar, of a grip on the bar, a stop at the inner end of the grip, a block or nut in the end of the bar, inturned stops struck from the metal of the bar, engaging and securing the block in place and means engaging the block for securing the grip in place, substantially as described.

6. In a handle-bar, the combination with a metal bar, of a grip formed of soft solid compressible material, a stop struck up from the bar, a ferrule interposed between the stop and grip, and means for forcing the grip toward the stop to compress the rubber onto the bar, substantially as described.

In testimony whereof I sign this specification in the presence of two witnesses.

THOS. B. JEFFERY.

Witnesses:
W. H. CHAMBERLIN,
GERTRUDE HEIDELBERGER.